July 9, 1968 K. D. SENEY 3,391,791
TRAP APPARATUS FOR DRAINAGE PIPES
Filed May 10, 1965 2 Sheets-Sheet 2

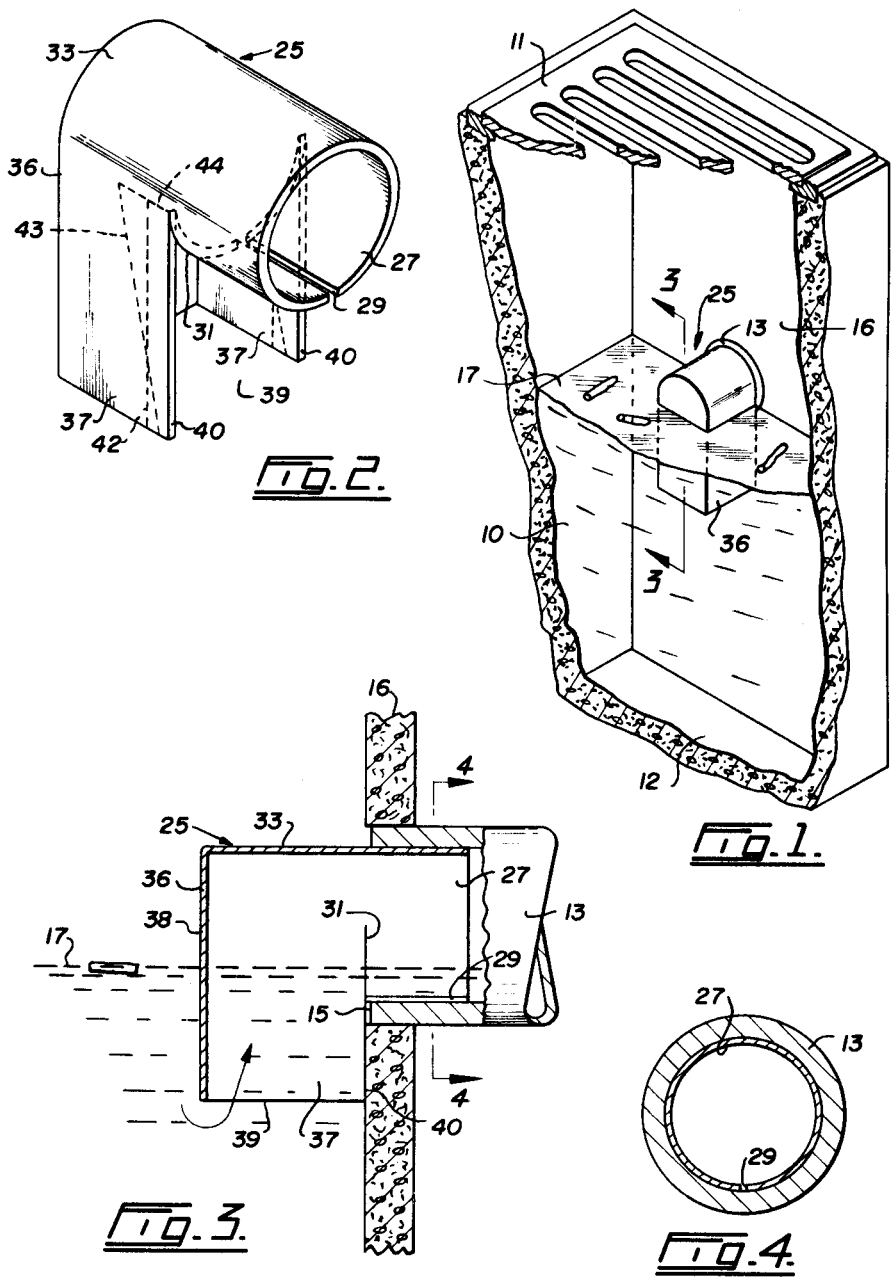

INVENTOR
KEITH D. SENEY
BY
Featherstonhaugh & Co.
ATTORNEYS

United States Patent Office
3,391,791
Patented July 9, 1968

3,391,791
TRAP APPARATUS FOR DRAINAGE PIPES
Keith D. Seney, Vancouver, British Columbia, Canada, assignor to C. B. Trapp Co. Ltd., New Westminster, British Columbia, Canada, a corporation of Great Britain
Filed May 10, 1965, Ser. No. 454,316
Claims priority, application Canada, May 12, 1964, 902,556
12 Claims. (Cl. 210—232)

ABSTRACT OF THE DISCLOSURE

Trap apparatus comprising a substantially horizontal and radially compressible sleeve adapted to be contracted and inserted into the inlet end of a drainage pipe extending from a side wall of a water-holding enclosure, and a hood connected to the sleeve and enclosing the inner end thereof and extending downwardly to a level below the sleeve and said inlet end of the pipe to an entrance at said level.

---

Figure 5:
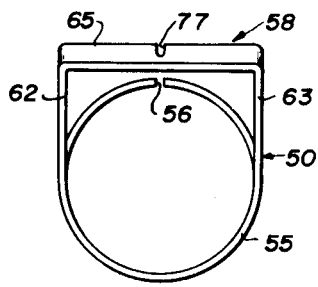

This invention relates to apparatus for the inlet ends of drainage pipes leading from enclosures such as street catch basins, septic tanks and the like.

This trap apparatus is used at the inlet ends of drainage pipes leading from enclosures adapted to hold bodies of water which run from these enclosures through said pipes. The drainage pipe is located above the bottom of the enclosure so that non-buoyant solids can settle to the bottom of the enclosure. The trap apparatus is intended to prevent floating solids from getting into the drainage pipe without impeding the flow of water through the latter.

This trap apparatus is particularly designed for street catch basins, and for the sake of convenience, it will be described in connection with these, but it is to be understood that the trap apparatus may be used in other enclosures, such as septic tanks, where liquid is drained out and it is desired to prevent solids from flowing with it.

A street catch basin is an enclosure with a grid over the top and into which drainage water flows. A drainage pipe extends from the catch basin to a discharge point, such as a sewer system. Dirt, stones and the like settle to the bottom of the catch basin and are periodically cleaned out of it. Floating debris, such as sticks, leaves and the like, are prevented from entering the drainage pipe by the trap apparatus.

In the past, catch basins have had traps or hoods hung over the inlet ends of the drainage pipes extending therefrom. These traps or hoods are hung on hooks so as to be removable for cleaning purposes. As the catch basins are usually made of concrete it usually takes one, two or more hours to drill holes into the concrete into which the hooks may be inserted. This requries special drill equipment, and is a great waste of time. These hooks rust away and have to be replaced, necessitating the drilling of new holes. Often the traps fall off the hooks thereby allowing floating material to travel through the drainage pipe into the sewer system. Some attempt has been made to eliminate this problem by forming a large recess in the wall of the catch basin above the drainage pipe outlet thereof. A wooden block is driven into the recess, and this may be easily drilled for the insertion of hooks. However, as these blocks are alternately wet and dry, they soon fall out of their recesses, or the pins come out of the wood. The traps or hoods are often vibrated off of these hooks. Furthermore, there are sometimes blow-backs in the sewer system which knock some traps off their hooks.

The trap apparatus of this invention may include its own trap or hood, or it may be used with a standard trap or hood. In either case, the apparatus does not require any special construction in the catch basin, may be installed in less than five minutes, can be easily fitted to outlet or drainage pipes which extend at different angles from the catch basin, will not vibrate loose once it is installed, and will not be dislodged by blow-backs in the sewer system.

Figure 6:
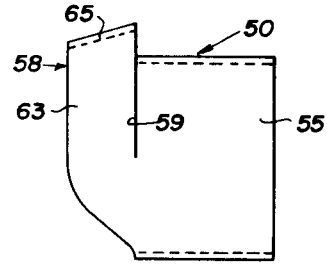
Figure 7:
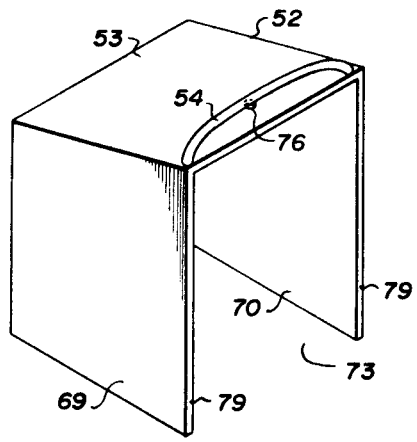
Figure 8:
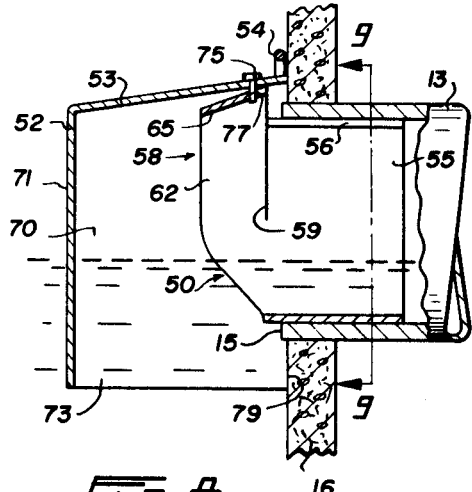
Figure 9:
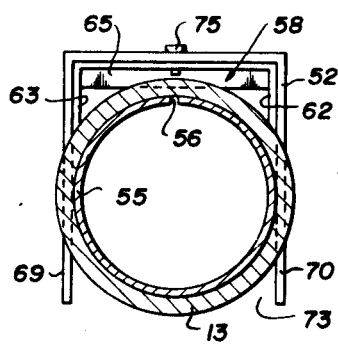

In the accompanying drawings, which illustrate two examples of this trap apparatus, FIGURE 1 is a view looking into a portion of a catch basin with a preferred form of trap apparatus mounted therein, FIGURE 2 is an enlarged perspective view of the trap apparatus illustrated in FIGURE 1, FIGURE 3 is a vertical section taken substantially on the line 3—3 of FIGURE 1, FIGURE 4 is a cross section taken on the line 4—4 of FIGURE 3, FIGURE 5 is an end elevation of an alternative form of trap apparatus, FIGURE 6 is a side elevation of the apparatus of FIGURE 5, FIGURE 7 is a perspective view of a standard hood to be used with the apparatus of FIGURES 5 and 6, FIGURE 8 is a longitudinal sectional view through the apparatus of FIGURE 5 with the hood mounted thereon, said apparatus being shown positioned in the inlet end of a drainage pipe, and FIGURE 9 is a section taken on the line 9—9 of FIGURE 8.

Referring to FIGURES 1 to 4 of the drawings, 10 is a street catch basin having a grid 11 at the top thereof and a bottom 12 spaced below said grid. A drainage pipe 13 extends from basin 10 to a sewer system, not shown. This pipe has an inner end 15 which opens through wall 16 of the catch basin. Pipe 13 is spaced above bottom 12 so that a body of water 17 is maintained in the catch basin, said water as the level thereof tends to rise, flowing out of the basin through pipe 13.

Trap apparatus 25 is provided for the inner end of pipe 13. This trap apparatus includes a radially expansible sleeve 27 which is adapted to be contracted and inserted into the inlet end 15 of pipe 13. In the preferred form of the invention, the sleeve is formed of a springy metal, such as aluminum, galvanized iron, or a suitable plastic material, and it is made expansible by a slit 29 which extends longitudinally thereof. The slit of the sleeve makes it possible to squeeze the sleeve down to a diameter less than its normal diameter so that it can easily be inserted into pipe 13. When the sleeve is released, it springs back towards its normal size, at which time it snugly fits into the pipe, as clearly shown in FIGURES 3 and 4.

Hood supporting means is connected to the inner end 31 of the sleeve. In this example, the hood supporting means is an extension 33 of the sleeve which is roughly the same length as the sleeve itself. A hood 36 is connected to and depends from extension 33, said hood having opposed side walls 37 and an outer wall 38. Extension 33 forms a top for the hood, and said hood is open at the bottom 39 thereof. The inner edges 40 of side walls 37 substantially bear against catch basin wall 16. Hood 36 extends below the level of pipe 13 so that the open bottom 39 thereof is below said pipe level. Actually, the open bottom 39 forms an entrance for the hood and sleeve 27 which, in turn, form an entrance for pipe 13. If desired, each side wall 37 may be scored along the lines 42 and 43 near the inner edge 37 thereof. Score line 42 extends substantially parallel with edge 37, while line 43 extends upwardly and inwardly from said edge, as clearly shown in FIGURE 2. Another score line 44 extends across the upper ends of lines 42 and 43 to the adjacent edge 40 of wall 37.

In order to mount trap apparatus 25 in drainage pipe 13 of catch basin 10, it is only necessary to compress sleeve 27 to reduce the diameter thereof, and then to insert the sleeve into pipe 13 until edges 40 of side wall 37 of hood 36 engage wall 16. As sleeve 27 is released, it tends to spring back to its normal size and thereby engages the inner surface of pipe 13, as shown in FIGURES 3 and 4, firmly to hold apparatus 25 in position. With the apparatus mounted in this manner, water cannot travel directly to pipe 13, it must enter hood 36 of apparatus 25 through the open bottom 39 thereof and travel upwardly through said hood to pipe 13. Non-buoyant materials sink to the bottom of catch basin 10, while hood 36 prevents floating material from travelling into pipe 13.

It has been found that apparatus 25 cannot be vibrated out of pipe 13. In order to remove the apparatus, it is necessary to contract sleeve 27 in a radial direction, and then to pull it straight out from pipe 13. The weight of hood 37 tending to pull the outer end 31 of sleeve 27 downwardly slightly, and the resiliency of the sleeve itself, cause the sleeve to bind in pipe 13, and it is quite difficult to remove apparatus 25 from the pipe. A blow-back in the sewer system tends to cause water to flow through pipe 13 back to catch basin 10. As this flow of water usually catches hood 36 towards the bottom thereof, it causes sleeves 27 to bind in the pipe rather than remove apparatus 25 therefrom.

Score lines 42, 43 and 44 make it possible to fit apparatus 25 properly when pipe 13 extends away from catch basin 10 at lateral angles relative thereto or downwardly therefrom. If the pipe 13 extends downwardly from the basin, the pieces of material defined by inclined score lines 43 and horizontal lines 44 are removed from side walls 37 to permit said walls to bear against wall 16 of the catch basin with sleeve 27 inclined downwardly in pipe 13. If the drainage pipe extends away from the basin at a lateral angle, the piece of material defined by vertical line 42 and horizontal line 44 of one of the side walls 37 is removed in order to permit sleeve 27 to extend away from said side wall, while the edge of the latter wall bears against catch basin wall 16.

FIGURES 5 to 8 illustrate an alternative form of trap apparatus 50 which may include its own trap or hood 52, or the latter may be a standard trap or hood used with this apparatus. A standard hood is shown in the drawings, and it has a sloping top 53 and a handle or bracket 54 which previously served as a hanger for the hood.

Apparatus 50 includes a radially expansible sleeve 55 formed of suitable springy material, such as aluminum, galvanized metal or a suitable plastic, which is formed with a slit 56 extending longitudinally thereof, preferably at its top. This sleeve is adapted to be contracted and then inserted into drainage pipe 13 extending away from catch basin 10. Hood supporting means 58 is connected to the inner end 59 of the sleeve. In this example, the hood supporting means comprises a bridge substantially in the form of an inverted U having vertical legs 62 and 63 connected to the inner end 59 of sleeve 54 at opposite sides thereof, and a cross piece 65 extending between said legs above the longitudinal axis of the sleeve. In this example, cross piece 65 is inclined relative to legs 62 and 63 to accommodate the slope of top 53 of standard hood 52. It is preferable to make the slope of cross piece 65 steeper than that of the hood top 53 so that sleeve 55 may be inclined downwardly if pipe 13 is so inclined relative to catch basin 10.

Hood 52 has side walls 69 and 70 and an outer wall 71, and is formed with an open bottotm 73. The top 53 of the hood rests on cross piece 65 of the supporting bridge, and it is usually held in place by a pin 75 which is secured to and projects downwardly from the top of the hood into a notch 77 in cross piece 65.

Apparatus 50 is moved into place by contracting sleeve 55 and inserting it into inlet end 15 of drainage pipe 13. When the sleeve is released, it expands and grips the inner surface of the pipe. The sleeve is moved into the pipe sufficiently to bring the edges 79 of side walls 69 and 70 of the hood against catch basin wall 16. With this arrangement, the water must travel through the open bottom 73 of hood 52 before it can enter pipe 13 so that floating material is kept away from said pipe. As stated above, hood 52 may be made specially for apparatus 50 or it may be a standard hood commonly used today. The hood is held squarely against wall 16 of the catch basin, and as it only rests on cross piece 65 and is held in position by pin 75, sleeve 55 may be inclined downwardly or laterally relative to the hood to fit into pipe 13 without affecting the fitting of the hood against said wall. Hood 52 can be lifted off cross piece by means of a hook lowered into the catch basin, said hook being maneuvered to fit under handle 54.

What I claim as my invention is:

1. Trap apparatus for the inlet end of a drainage pipe leading from a side wall of an enclosure adapted to hold a body of water which runs out through said pipe, comprising a radially compressible substantially horizontal sleeve adapted to fit in the inlet end of a drainage pipe extending from a side wall of a water holding enclosure, said sleeve having an inner end projecting into the enclosure, a bridge substantially in the form of an inverted U having vertical legs connected to the inner end of the sleeve at opposite sides thereof and a cross piece between said legs above the sleeve, and a hood removably secured to the bridge and enclosing the sleeve inner end, said hood having a top and two opposed side walls and an outer wall depending from said top and extending to a level below the sleeve and said inlet end of the drainage pipe, said hood top resting on the cross piece of the bridge with edges of the top and side walls bearing against the enclosure side wall, and said hood having an entrance at said level, whereby water can flow through the hood entrance and out of the enclosure through the drainage pipe while debris floating on the water is kept by the hood from reaching said drainage pipe.

2. Trap apparatus for the inlet end of a drainage pipe leading from a side wall of an enclosure adapted to hold a body of water which runs out through said pipe, comprising a substantially horizontal sleeve radially compressible from end to end thereof and adapted to fit in the inlet end of a drainage pipe extending from a side wall of a water holding enclosure, an extension aligned with and connected to the sleeve so as not to interfere with the compressibility thereof and extending into the enclosure, said extension opening downwardly relative to the sleeve, a hood connected to the extension and free of the sleeve enclosing the downward opening thereof and extending downwardly to a level below the sleeve and said inlet end of the drainage pipe, said extension and said hood each having a cross sectional area throughout the length thereof at least as large as the cross sectional area of the sleeve, said hood having an entrance at said level, whereby water can flow through the hood entrance and out of the enclosure through the drainage pipe while debris floating on the water is kept by the hood from reaching said drainage pipe.

3. Trap apparatus as claimed in claim 2 in which said hood has a vertical outer wall closing the end of the extension remote from the sleeve and two opposed side walls, said outer and side walls extending below the extension and sleeve, and edges of said side walls bearing against the enclosure side wall when said hood is in operative position.

4. Trap apparatus as claimed in claim 3 in which said side walls of the hood have score lines spaced from and extending substantially parallel to said edges thereof, and horizontal score lines at the sleeve extension extending inwardly from the side wall edges to said first-mentioned score lines, whereby pieces can be removed from said side walls.

5. Trap apparatus as claimed in claim 3 in which said side walls of the hood have score lines extending from lower edges thereof upwardly angularly away from said side wall edges, and horizontal score lines at the sleeve extension extending inwardly from the side wall edges to said first-mentioned score lines, whereby pieces can be removed from said side walls.

6. Trap apparatus for the inlet end of a drainage pipe leading from a side wall of an enclosure adapted to hold a body of water which runs out through said pipe, comprising a substantially horizontal, sleeve formed of springy material and slit from end to end thereof along an upper surface whereby it can be contracted radially throughout the length of the sleeve and inserted into the inlet end of a drainage pipe extending from a side wall of a water holding enclosure, hood supporting means at the top of the inner end of the sleeve free of said upper surface and connected to the sleeve below said upper surface so as not to interfere with the contraction of the sleeve, and a hood removably mounted on and connected to said supporting means and enclosing said sleeve inner end, said hood extending downwardly to a level below the sleeve and having an entrance at said level, whereby water can flow through the hood entrance and out of the enclosure through the drainage pipe while debris floating on the water is kept by the hood from reaching said drainage pipe.

7. Trap apparatus as claimed in claim 6 in which the hood supporting means comprises a bridge substantially in the form of an inverted U having vertical legs connected to the inner end of the sleeve at opposite sides thereof and a cross piece extending between said legs above the sleeve.

8. Trap apparatus for the inlet end of a drainage pipe leading from a side wall of an enclosure adapted to hold a body of water which runs out through said pipe, comprising a substantially horizontal sleeve formed of springy material and slit longitudinally from end to end thereof along a lower surface whereby it can be contracted radially throughout the length of the sleeve and inserted into the inlet end of a drainage pipe extending from a side wall of a water holding enclosure, an extension of the sleeve connected to an upper surface thereof and free from said lower surface so as not to interfere with the contraction of the sleeve, said extension opening downwardly relative to the sleeve, and a hood connected to the extension and free of said sleeve and enclosing the downward opening thereof and extending downwardly to a level below the sleeve, said hood having an entrance at said level.

9. Trap apparatus as claimed in claim 8 in which said hood has a vertical outer wall closing the end of the extension remote from the sleeve and two opposed side walls, said outer and side walls extending below the extension and sleeve.

10. Trap apparatus as claimed in claim 9 in which said hood is open at the side thereof opposed to said outer wall.

11. Trap apparatus for the inlet end of a drainage pipe leading from a side wall of an enclosure adapted to hold a body of water which runs out through said pipe, comprising a sleeve formed of springy material and slit longitudinally from end to end thereof so that it can be contracted radially throughout the length of the sleeve and inserted into the inlet end of a drainage pipe extending from a side wall of a water holding enclosure with the longitudinal axis of said sleeve extending in a substantially horizontal plane, said sleeve on being released expanding snugly to fit in the pipe, a bridge substantially in the form of an inverted U having vertical legs connected to the inner end of the sleeve at opposite sides thereof when the sleeve is in a horizontal position and a cross piece extending between said legs above the sleeve, the connection of each of said legs to the sleeve being spaced from the slit thereof so as not to interfere with the contraction of the sleeve, and said bridge projecting from said pipe when the sleeve is inserted therein.

12. Trap apparatus as claimed in claim 11 including a hood carried by said bridge and hanging over and spaced from the sleeve inner end, said hood resting on the cross piece and extending below the sleeve and having an open bottom below the level of the sleeve.

References Cited

UNITED STATES PATENTS

| | | | |
|---|---|---|---|
| 140,145 | 6/1873 | Ledbeter | 210—532 |
| 334,378 | 1/1886 | Higgins | 210—533 |
| 459,440 | 9/1891 | Coleman | 210—533 |
| 1,005,153 | 10/1911 | Case | 285—7 |
| 1,005,371 | 10/1911 | Union | 210—533 |
| 2,423,810 | 7/1947 | Goulding. | |
| 2,564,172 | 8/1951 | Raaberg | 210—532 |
| 2,867,824 | 1/1959 | O'Connor. | |
| 3,057,796 | 10/1962 | Davis | 210—532 |
| 3,221,881 | 12/1965 | Weiler et al. | 210—532 |

FOREIGN PATENTS 12,837   1890   Great Britain.

SAMIH N. ZAHARNA, *Primary Examiner.*

REUBEN FRIEDMAN, *Examiner.*

F. MEDLEY, *Assistant Examiner.*